United States Patent
Barcy et al.

(10) Patent No.: US 6,542,200 B1
(45) Date of Patent: Apr. 1, 2003

(54) TELEVISION/RADIO SPEECH-TO-TEXT TRANSLATING PROCESSOR

(75) Inventors: Daniel J. Barcy, Coral Springs, FL (US); Charles W. Statkus, Delray Beach, FL (US)

(73) Assignee: Cheldan Technologies, Inc., Coral Springs, FL (US)

(*) Notice: Subject to any disclaimer, the term of this patent is extended or adjusted under 35 U.S.C. 154(b) by 36 days.

(21) Appl. No.: 09/930,704

(22) Filed: Aug. 14, 2001

(51) Int. Cl.[7] .......................... H04N 7/00; H04N 11/00
(52) U.S. Cl. ...................... 348/468; 348/473; 348/553; 348/61; 704/271; 704/277
(58) Field of Search ................................ 348/468, 473, 348/467, 476, 477, 478, 553, 563, 564, 552, 725, 724, 61; 704/271, 277, 270, 235, 251, 257, 260; H04N 7/00, 11/00

(56) References Cited

U.S. PATENT DOCUMENTS

| | | | |
|---|---|---|---|
| 4,852,170 A | 7/1989 | Bordeaux | |
| 4,882,681 A | 11/1989 | Brotz | |
| 5,475,798 A | * 12/1995 | Handlos | ..................... 704/277 |
| 5,524,137 A | 6/1996 | Rhee | |
| 5,615,301 A | 3/1997 | Rivers | |
| 5,815,196 A | 9/1998 | Alshawi | |
| 5,900,908 A | * 5/1999 | Kirkland | ....................... 348/62 |
| 6,151,572 A | 11/2000 | Cheng et al. | |
| 6,175,819 B1 | 1/2001 | Van Alstine | |
| 6,219,646 B1 | 4/2001 | Cherny | |
| 6,240,392 B1 | 5/2001 | Butnaru | |
| 6,374,215 B1 | * 4/2002 | Chan et al. | .................. 704/235 |
| 6,415,257 B1 | * 7/2002 | Junqua et al. | ............... 704/275 |

* cited by examiner

Primary Examiner—Michael H. Lee
(74) Attorney, Agent, or Firm—Malin, Haley & DiMaggio, P.A.

(57) ABSTRACT

A device used with a conventional television set that permits both hearing impaired and non hearing impaired individuals to view television audio voice signals in a text format on the television screen without the requirement of a closed/open caption broadcast signal or a closed/open caption enabled television. The device also can utilize an FM audio input, an audio line input, and a microphone or impedance input for conversion into a text format. The system may use on-board or remote displays, wireless or wired, for also providing the text format representative of human speech. The system includes audio filters for filtering a television audio signal and filtering out human speech audio signals for processing and conversion by a speech-to-text converter.

7 Claims, 2 Drawing Sheets

TELEVISION/RADIO SPEECH-TO-TEXT TRANSLATING PROCESSOR

BACKGROUND OF THE INVENTION

1. Field of the Invention

This invention relates generally to a device that is used with a conventional television set, that permits both hearing impaired and non hearing impaired individuals to view television audio voice signals in a text format on the television screen without the requirement of a Close/Open Caption broadcast signal or a Close/Open Caption enabled television

2. Description of Related Art

People who are hearing impaired or who have no hearing at all are severely limited in their watching and understanding of television presentations that include human speech. Some television networks or specific TV programs provide, at great expense, closed-captioned text for hearing impaired people that provide speech translations on the television screen in real time of the television presentation. Unfortunately, this is not universally available. Therefore, the limited availability of closed-captioning and its cost severely limit the enjoyment of television for someone that is hearing impaired. To generate closed caption speech display of a television program requires the network to employ one or more typists who listen to the human speech live and type the words for transmission and display on screen. This method is extremely expensive.

The hearing impaired are also limited in their participation in other venues, particularly entertainment, such as motion picture theatres. Typically there is no closed-caption available. There are also numerous other environments, such as public speaking events, teaching in classroom settings, live plays, and social meetings, where someone who is hearing impaired or has no hearing at all cannot participate.

The use of sign language for hearing impaired persons has been employed on a specific basis, show-by-show, but in many environments is not totally practical.

Correspondingly, participants who must converse in difference languages provide a somewhat comparable environment as that experienced by the hearing impaired. A person unable to speak or converse in a particular language is not able to comprehend, and cannot enjoy television in a different language or participate in other events that require the ability to hear and translate the different language that is being spoken.

The purpose of the present invention is to provide a small, portable device that can alleviate the problems discussed above for the hearing impaired. Particularly in one embodiment, the invention can be utilized in conjunction with a conventional television set. The invention acts to convert the audio portion of the input television signal in a household that is received either from cable or through an antenna, to provide a human speech text stream printout on the screen in real time. In other alternate embodiments, the present invention can extend to all forms of media, including radio that provides human speech, by including a visual display unit that converts all human speech into a visually displayed text format on a television screen or on a separate portable LCD display. Such a device can be hand-held, battery-operated, and used in almost every situation for processing audio speech and converting it to a visual text display.

SUMMARY OF THE INVENTION

A television and radio speech-to-text translating processor that allows a person who hearing impaired or deaf to watch a conventional television program in a domestic setting, such as the user's home, that is connected directly to the user's television signal input, which can either be an antenna, cable television input, or satellite input.

The television speech-to-text processor includes a box-like housing that can be mounted on or near a conventional television set and a separate remote control unit that is hand-held and resembles a conventional television set remote control.

The processor unit mounted in the housing may include a plurality of inputs and input connectors that includes a television cable/television antenna signal input, a line input (audio), a high Z input (audio), and an RF (FM) input (audio). Each of the inputs described herein may be in the form of input jacks mounted on a panel that forms part of the housing.

The main processor would also include a plurality of signal output jacks or connectors that includes a television signal, either channel 3 or channel 4 output, the RF (FM) output (text), a serial output (text), and an infrared (IR) output (text). Again, the outputs described herein may include jacks or connectors that are formed on a single panel that is part of the housing of the main processor.

Conventional television sets may or may not include additional circuitry for providing on-screen closed captioned displays that are generated by a specific network on a particular television channel. Thus, one of the considerations is that the present invention can produce a display of text representing human speech embodied in the audio television signal for either type of television set, whether it includes closed caption capabilities or whether it doesn't. The present invention includes a manual and remote control activated selector switch that allows the user to select either closed caption or automatic so that the system and main processor embodied in the present invention can determine whether to employ the present invention text generator or utilize closed caption when it is being transmitted from a specific station.

The main processor unit mounted in the housing includes circuitry for initially providing audio input selector. Each of the signal inputs to the device, including the line input, the high Z input and the RF (FM) input, are directly connected to the audio input selector.

The main television signal input from the TV cable or television signal antenna input is connected directly to a TV channel tuner having an output connected to an audio/video decoder. The decoder has three separate outputs. The first output is a complete TV audio signal that is transmitted to an audio/video text encoder. The second output is a video signal which represents the entire TV video signal which may or may not include closed-caption video. This output signal goes to a closed-caption decoder for the video. The third output is an audio output that represents the TV audio signal that goes to the audio input selector. The housing may include a manually activated selector that selects the desired output from the main processor unit by virtue of selecting the particular input to be processed by the system. In the preferred embodiment, it will be the television signal.

The main processor unit includes a closed caption video decoder having an input that receives the TV video from the audio/video decoder for decoding closed caption data (if present on line 21) received from the incoming television signal. The output of the closed caption decoder goes to the input of a closed caption/local text display encode selector. The main processor housing includes a manual switch that allows the end user to select either automatic selection which selects either closed caption data or the local text display of the present invention if closed caption is present or a switch that excludes closed caption completely and permits only text display in accordance with the present invention. The remote control switch also could include encode selection similar to that, between closed caption and the text display of the present invention.

The main processor unit includes an automatic gain control, the input of which is connected to the audio input selector output. This component will control the gain of the signal, regardless of its input and will control, for example, the audio signal received from the audio/video decoder that represents the audio signal of the television input signal separated from the video portion.

The audio signal is then sent to one or more audio filters from the automatic gain control to filter out all non-human speech sounds and audio that is outside the range of human speech. This will help alleviate musical sounds, noise, other undesired sounds, or sounds that are not capable of representing human speech.

After the audio signals have been filtered to be restricted to ranges of human speech, the signal is passed to a speech-to-text converter. This is where the primary language hat is going to be converted into text, such as English, Spanish or French, is selected through a manual switch on the housing and also with a remote control switch. The input language selector has a manual or remote switch input that selects the incoming language.

Once the input language selector has been activated for a specific language such as English, the filtered audio signal is sent to a speech-to-text converter where the human speech in audio form is then converted into a text alpha numeric signal that is capable of displaying a text format on a display screen, such as a CRT or LCD, based on the alphabet and text of human language. In the preferred embodiment this is done with an IBM Via Voice voice recognition speech engine.

Once the audio human speech data input has been converted to another signal that represents ASCII, and signal data for displaying text, the data signal is sent to a language translator. The purpose of this component is to literally select what language will be in text output, such as English, French, Spanish, or other. An output language selector is manually switched on with a remote to select the output language and to send the signal to the closed caption/local text display encode selector for the television signal. The text output language selector includes a switch on the housing for selecting the desired language manually and also may include a similar switch that can be activated by remote control for selecting the desired output language.

The language selector may also include an output that goes directly to a liquid crystal display on-board text display that could be read directly from an LCD display mounted on the main processor housing as an option.

The closed caption/local text display code selector that has a manually activated switch on the main processor housing could select either automatic or select local text display only which would by-pass closed caption. Selection of automatic would allow the system to select either closed caption or the local text display, depending on which is a better signal. The encode selector can also be done by remote control in either an automatic mode or local text display only.

The output of the closed caption/local text display and code selector goes directly to the input of an audio/video/closed caption text encoder that modulates and adds the video text output signal to the original incoming television video signal (which contains both the video and the audio signals) and directs the complete signal to an RF modulator. After modulation to channel 3 or channel 4 frequency, the signal goes to TV channel 3 or channel 4 output. The TV channel 3 or channel 4 output is connected directly to the television set itself is set to receive channel 3 or channel 4.

The program displayed by the television set would include the transmitted video TV program, including all sound, music and human speech transmitted in the television signal and would include a local text display of the human speech audio in a text format displayed on screen in real time. A person watching the television program would see the live streaming text displayed along the bottom of the screen in conjunction with sound and video. If a closed caption signal was transmitted in the video signal and the television receiver can display closed caption, the person may see closed caption. However, if closed caption is not being transmitted, is of unacceptable quality, or if the TV is not enabled for closed caption, the person will see local text display of all the human speech being transmitted and displayed in the television show.

The main processor unit may also include an RF (FM) output which would be thus the human speech input converted to text displayed on a remote on-board text display device. This could also be done for a wire-to-wire serial output in text format to a display box and a wireless infrared output in text to on-board text display, such as a CRT or LCD.

In a conventional incoming video television signal, closed caption data may be provided in the video signal line 21. The present invention in the main processor unit can detect the presence of closed caption data in line 21 in the video signal, which then acknowledges that there is closed caption data being transmitted in the input television signal. The present invention is capable of recognizing this data presence and selecting between continued transmittal of the closed caption data through to the television set so that the closed caption data will be displayed in lieu of the local text display created by the present invention. If the video signal does not contain line 21 data, then no closed caption data is present and the present invention will provide specifically local text display in accordance with the invention. Also, local text display will be provided in accordance with the present invention by automatic or manual selection, especially for television sets which do not have the capability for recognizing and processing closed caption video data.

With the use of the present invention, using a convenient, relatively small sized main processor unit that has a small housing that can be mounted on or adjacent to a conventional television set with very minimal input and output wiring, the present invention can be used with a conventional television set, with or without a VCR connection, that allows a person who is hearing impaired or who is completely deaf to observe a television program, whether it be live or pre-taped on a video cassette recorder, to display during the transmission of the program, a stream of text that represents the human speech portions of the audio signals being generated by the presentation and display of the television program.

The present invention also provides for direct audio inputs from FM radio and other audio inputs from a microphone or impedance source or speaker.

The present invention includes its own self-contained liquid crystal display to provide visual textual display of the audio signals. Again, this allows a hearing impaired person or deaf person to participate in an environment such as listening to a radio or listening to someone with a microphone while, in fact, looking at the text display on a screen.

In an alternate embodiment, the present invention could include its own microphone, connected to an input that allows the hearing impaired person to be present in a room where people are speaking and to observe the audio portion of the human speech in a text display on the LCD screen.

It is an object of this invention to provide a device that can utilize an input television signal with or without closed caption data and that can convert the audio portion to a local text display on the screen in real time during presentation of the TV program so that the person who is hearing impaired can read the textual conversion of the human speech being portrayed.

It is another object of this invention to provide an improved, low cost, portable device that can be used with a conventional television set to provide a textual display and be used in conjunction with television programming and TV sets that are capable of closed caption.

In accordance with these and other objects which will become apparent hereinafter, the instant invention will now be described with particular reference to the accompanying drawings.

PREFERRED EMBODIMENT OF THE INVENTION

Figure 1:
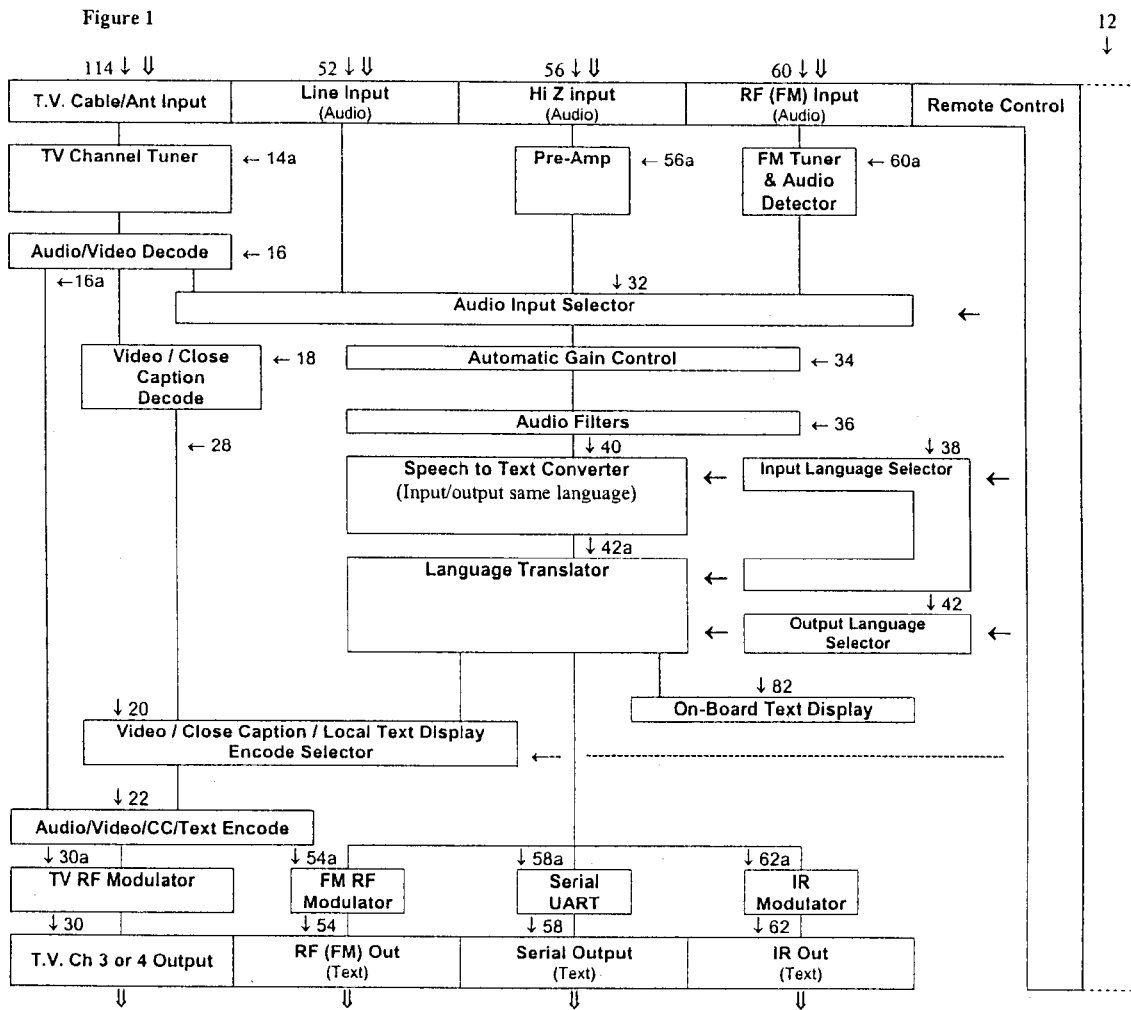
FIG. 1 is a schematic diagram of the present invention.

Referring now to FIG. 1, the preferred embodiment of the invention is shown generally at 10, including a housing 12, indicated by dotted lines, that encloses the main processor unit for the television and audio signal processor for providing a display of text, primarily for the hearing impaired, on a television screen or an on-board textual display. The preferred embodiment also includes a hand-held remote control unit 14 that is used to select manually and remotely various functions of the present invention.

The heart of the preferred embodiment of the invention includes the main processor that has a TV cable and TV antenna signal input 114 which would typically be a jack or electrical connector that would connect to a TV cable or to the antenna used for the television set. The input 114 receives a conventional television signal with or without closed caption video.

The input to housing 12 could also include a line input 52 for an audio input, high Z input 56 which is audio, and RF(FM) input audio 60, all of which could be mounted on a single input panel to be comprised of electrical connectors or jacks that receive the input signals. The output of a TV signal input is a TV channel tuner 14a, which is connected to an audio/video decoder 16. The high Z input 56 has an output connected to a pre amplifier 56a. The FM input 60 has an output through an FM tuner and audio detector 60a.

Mounted in housing 12 and connected to the output of the TV cable and antenna signal input 114 is an audio/video decoder 16 which has three outputs, two audio and one video. The purpose of the decoder 16 is to separate the video and audio signals from the television signal that includes both video and audio for subsequent processing. The decoder may include a chip, Model No. ADV 7194 video decoder, manufactured by Analog Devices. One output of the audio/video decoder 16 includes an output wire 16a that inputs the complete audio signal to an encoder 22. In wire 24, the complete audio television signal is transmitted intact. The audio/video/closed caption encoder 22 includes a chip, Model No. ADV 7185, which is a video encoder manufactured by Analog Devices.

Because some television sets have circuitry that recognizes closed caption on TV signal line 21, the output of the audio/video decoder 16 also includes an input to a video closed caption decoder 18.

The present invention provides for using either local text display generated by the present invention or available closed caption provided by a television broadcaster. Not all TV sets can receive closed caption. The invention can be set up to provide for automatic closed caption selection if available or manual selection of the local text display only provided by the present invention, without closed caption.

The video closed caption decoder 18 is comprised of a chip that has an output to the closed caption/local text display encode selector 20. The encode selector 20 allows the selection of transmitting either the local text display output to the audio/video CC text encode 22, or allowing for the closed caption. As shown in FIG. 1, the output then from encoder 22 would be a TV channel 3 or channel 4 output that goes to a conventional television set that has been manually selected for either channel 3 or channel 4.

In order to provide for local text display on the conventional television set and the appropriate video signal to output 30, the audio/video decoder 16 has an audio output connected to an audio input selector 32. The audio input selector 32 includes additional optional inputs from line input 52, pre amplifier 56a, and RF(FM) tuner input 60a, all of which can independently and individually be selected at the audio input selector by manual selection on the housing of the main processor 12. The device also includes remote control 14 which is hand-held and portable and has a manual selector for initiating the audio input selector to those described herein or encoding input 114 from the TV cable or antenna.

Once the audio input selection has been made, which in the preferred embodiment would be selecting the television signal from decoder 16, which is an audio signal representing the sound portion of a television signal received at input 114, the audio signal is transmitted to an automatic gain control 34 which is used to provide signal strength at a desired level for processing in the unit. The output of the automatic gain control audio signals, once processed, goes to audio filters 36.

The purpose of audio filters 36 is to select human speech, based on frequency, from other sounds being transmitted in the audio portion of the television signal, such as music, noise, or sounds not representative of human speech. Note that as far as the output signal at TV channel 3 or 4 output 30, there would be the complete television sound signal of the television program transmitted there to include music or any other noise presented during the television programming.

Once the human speech sound has been isolated in audio filter 36, that audio human speech data is transmitted to the speech-to-text converter. An input language selector 38 allows manual selection by the user of the language. The purpose of the input language selector 38 is to allow the user to manually select, either through a switch on housing 12 or with a remote control switch 46, the desired language that is being inputted. For example, if the television program is anticipated to be in the English language, then the input language selector would be English.

Once the language has been selected, then the speech signal is converted to text in the speech-to-text converter 40. In the preferred embodiment, this would be an IBM Via Voice Version 8 speech engine and language database program. The present invention includes a CPU and RAM memory necessary, including a database memory, to accommodate speech-to-text converter 40.

Once the audio signal which has been filtered to transmit only human speech and the language has been selected in selector 38, the speech data is then converted to a digital output signal that can drive a text display through engine 40. It is necessary, however, to select the output language, which may be English in the example, or a foreign language that is selected by the text output language selector 42, which is a manual selector switch located on housing 12. The switch may also be mounted in a remote control device 14 for selecting the language for translation in translator 42a.

The digital signal from language translator 42a, which will be in ASCII, is then transmitted to the encode selector 20 which represents the local text display data. At this point, one input is the data that represents the human speech from the TV signal. If the local text display is selected manually in lieu of closed caption in encode selector 20, data is transmitted to text encoder 22 where the signal is modulated and incorporated into the video portion of the television signal received from decoder 16 that can be outputted to RF modulator 30a and into channel 3 or channel 4 frequencies to the output 30 connect to a television set.

The signal at output 30 is a television signal for channel 3 or for channel 4 that includes the complete video signal of the television program received at TV cable input 114, the complete audio portion of that signal received at input 114, including all sounds, music, including human speech, and the video encoded portion of the text generated by human speech for local text display on the television screen through the video output. If the processor's manual switch is set up in the automatic mode for closed caption selection on an automatic basis when available, in lieu of the local text display, then the output 30 will have closed caption and will not include the local text display. If the closed caption is excluded or is not available on the particular television set that the invention is being used with, then the local text display data signal will be incorporated into the video output signal at output 30.

The present invention can also process line input audio from input 52 or high Z input 56 or FM audio input at 60 by the proper selection of audio input selector 32, manually on the housing or with the remote control. That selection will therefore provide display speech to a remote LCD display, wireless or wired, and also to the on-board LCD display 82.

The output of the text output language selector 42 can also be an FM text display 54, serial output text 58, or infrared IR output text 62, any of which could be on the on-board text display 82.

As shown through a description of this invention, with the preferred embodiment of the invention, the user can install a housing or black box unit on top of the user's television set and, through the appropriate cable input 114 or the other inputs described, connect the output of housing 12 to the user's conventional television set.

The user can then be a hearing impaired or non hearing impaired person or a totally deaf person who can literally turn on any television station with any show at any time, and in real time receive a text display of the human speech being spoken in the audio portion of the television signal as it is received. The need for closed caption is completely eliminated by the present invention at the television station.

Figure 2:
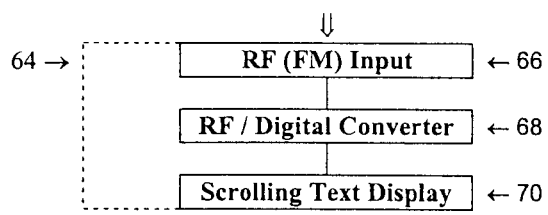
FIG. 2 shows the remote display and control unit.

FIG. 2 shows an example of a remote display and control unit 64 that provides for controlling the RF FM input 66, which is an input from an FM radio station which can be converted to a text display. The FM input would include an output to an RF digital converter and for the remote display that shows the scrolling text display, which would be an LCD unit that can be remotely mounted from the present invention.

Figure 3:
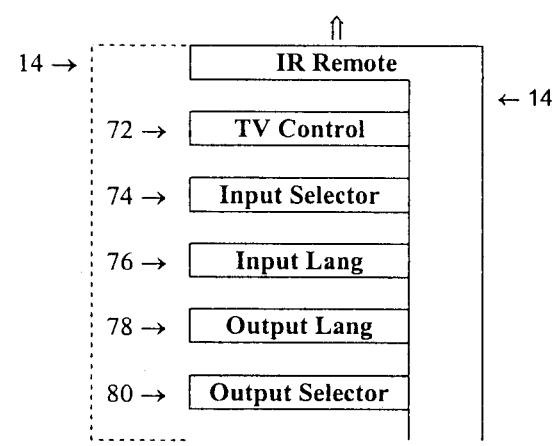
FIG. 3 shows the infrared remote control device used for the television display.

FIG. 3 shows the hand-held remote 14 that uses infrared that would include a TV station control 72 for selecting the channel in the present invention that is ultimately processed and modulated to represent a channel 3 or channel 4 input into the television set; the input selector 74 which would represent which of the audio inputs, including the television signal, to be selected as shown in FIG. 1. The device shown in FIG. 3 can also include the input language selector 76 button on the remote to select the desired input language that the TV show will be using, an output selector 78 for translation into a foreign language, if desired, and the final output selector 80 which will select between closed caption transmission and local text display generated by the present invention.

The present invention could also include, as one of the input lines, a microphone for taking human speech being spoken in a room and converting it to text on the LCD display. A hand-held unit could be created with battery power that allows one to take a portable hand-held box literally anywhere, to a motion picture production, plays, speeches, teaching environments, anywhere that someone is either broadcasting or transmitting human speech or where a person is speaking, that would allow a hearing impaired person to visually monitor the speech through a text display that would represent a scrolling text display.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A device for use with a conventional television set, that can receive a television signal from an antenna, from a cable input, or from a satellite input, that permit's both hearing impaired and non hearing impaired individuals to view television audio voice signals in a text format on the television screen in real time without the requirement of a closed/open caption broadcast signal or a closed/open caption enabled television comprising:

input means for receiving a conventional television signal that may include a closed/open caption video signal;

a television channel tuner connected to said television signal input;

means for decoding the audio and video signals in said television signal connected to the output of said channel under;

said means for decoding audio and video signals having first, second, and third output means;

means for encoding audio/video/closed-caption/text connected to said first output of said decoding means for receiving audio complete signal from said decoding means;

means for decoding closed-captioned video signal input connected to said second output of said decoding means for receiving the video closed-captioned signal for decoding;

audio input selector connected to said third output of said means for decoding audio and video;

automatic gain control connected to the output of said audio input selector;

means for providing audio filters connected to the output of said automatic gain control for filtering out audio signals other than human speech;

speech-to-text converters connected to the output of said audio filter means for converting the audio speech signals received from said audio filters to text signals;

means connected to said speech-to-text converter for electing the input language to said speech-to-text converter;

language translation means connected to the output of said speech-to-text converter and connected to an input from said means for selecting the input language;

output language selector connected to said language translator for selecting the desired language that is outputted from the language translator;

a closed-caption/local text display encode selector connected to the output of said means for decoding said closed-caption and the output of said language translator, said closed-caption/local text display encode selector including a manual selection switch having two modes of operation, one designating automatic encode selection for selecting either closed-caption or local text display, depending on the output of the closed-caption decoding means if available from the broadcast station, and a second mode of operation in which the selector switch selects continuous local text display, bypassing the closed-captioned data;

said audio/video closed-captioned text encoding means connected to the output of said closed-caption/local text display encode selector for receiving either closed-caption video signals or local text display signals, depending on the selector mode;

a TV/RF modulator connected to the output of said audio/video/close-caption/text encoder for combining the conventional television signal and the local text display, if selected, in the television signal and modulating the signal for either channel 3 or channel 4 output; and output means connected to the output of said TV/RF modulator for receiving the conventional TV signal, including audio and the close-captioned video signal or the local text display video signal in a selected language, having the frequency modulated to channel 3 or channel 4 for connecting to the conventional television set, whereby a hearing impaired or non hearing impaired individual may view both the conventional television signal and television audio voice signals in a text format on the television screen if closed-captioned broadcast signal is not available or if the television set is not enabled for closed/open caption.

2. A device in claim 1, including:

an RF (FM) audio input means; and

FM tuner and audio detector connected to the output of said FM input means, the output of said FM tuner and audio detector means being connected to the audio input selector.

3. A device as in claim 1, including:

line input means for receiving a signal from a speaker output, said line input means having an output connected to the audio input selector means.

4. A device as in claim 1, including:

high impedance input means for receiving an audio signal from a microphone or an inductance; and pre-amplifier means having an input connected to the output of high inductance input means, said pre-amplifier means for amplifying the audio signal received from said high impedance input and having an output connected to the audio input selector means.

5. A device as in claim 1, including:

a hand-held, portable, remote control means for controlling and selecting the desired input signal, including the television tuner input signal, the line input signal, the RF/FM input signal, and the high impedance input signal, said remote control including a manual switch for selecting the input language remotely connected to said input language selector means, and an output language selector switch connected remotely to said output language selector means.

6. A device as in claim 1, including:

an LCD display that is connected to the output of said language translator that provides a visual on-board text display of the audio voice input signals mounted on the device.

7. A device as in claim 1, including:

an infrared modulator connected to the output of said language translator; and an infrared output connected to the output of said infrared modulator for providing a wireless output that transmits a signal representing the audio text to a remote display device.

* * * * *